United States Patent

Suckow

[15] 3,700,261
[45] Oct. 24, 1972

[54] SPRING BAR ASSEMBLY FOR TRAILER HITCHES

[72] Inventor: Theodore K. Suckow, 160 Rock Road, Glen Rock, N.J.

[22] Filed: April 12, 1971

[21] Appl. No.: 133,239

[52] U.S. Cl. .......................... 280/406 A, 280/446 R
[51] Int. Cl. ............................................... B60d 1/06
[58] Field of Search ...................... 280/406 A, 406 R

[56] References Cited

UNITED STATES PATENTS 3,542,394   11/1970   Palage ................... 280/406 A

*Primary Examiner*—Leo Friaglia
*Attorney*—Arthur Frederick

[57] ABSTRACT

The spring bar assembly for trailer hitches provides for each articulating spring bar, located adjacent opposite sides of a trailer A frame, dual suspension members interconnecting the free end portion of the spring bar with the A frame in such a manner that the opposite ends of each of the suspension members are connected at points lying in spaced, imaginary, vertical planes to thereby provide a bending lift on the spring bar of relatively great amount in relation to the amount of relative horizontal movement between the spring bar and A frame.

16 Claims, 9 Drawing Figures

PATENTED OCT 24 1972 3,700,261
SHEET 1 OF 3
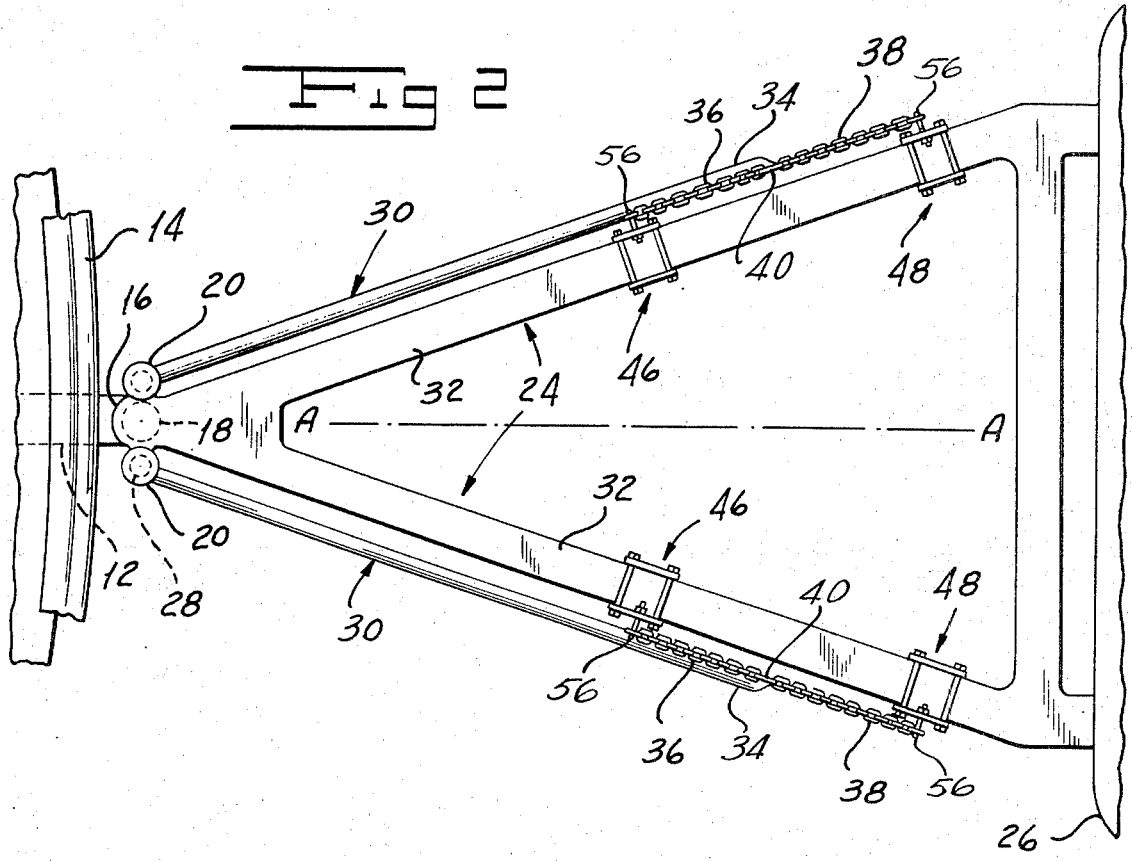
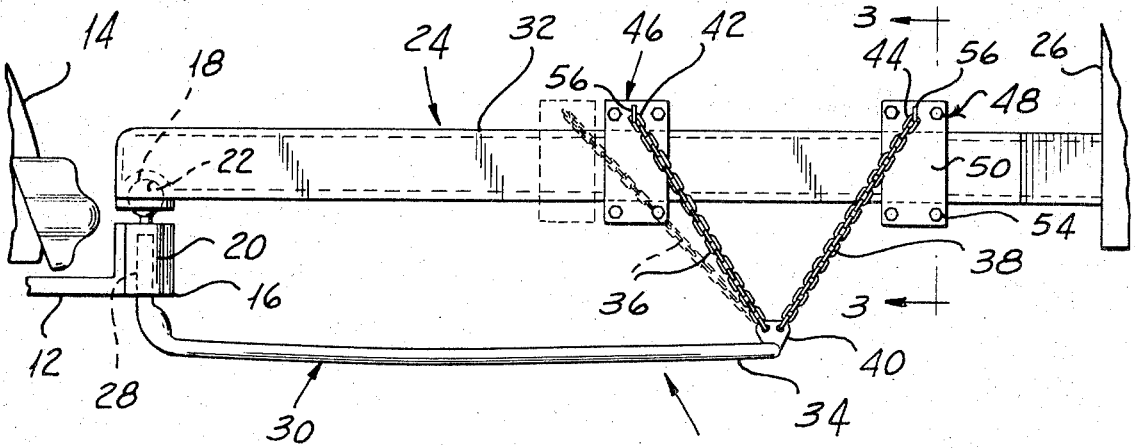
INVENTOR.
Theodore K. Suckow
BY
Arthur Frederick
ATTORNEY

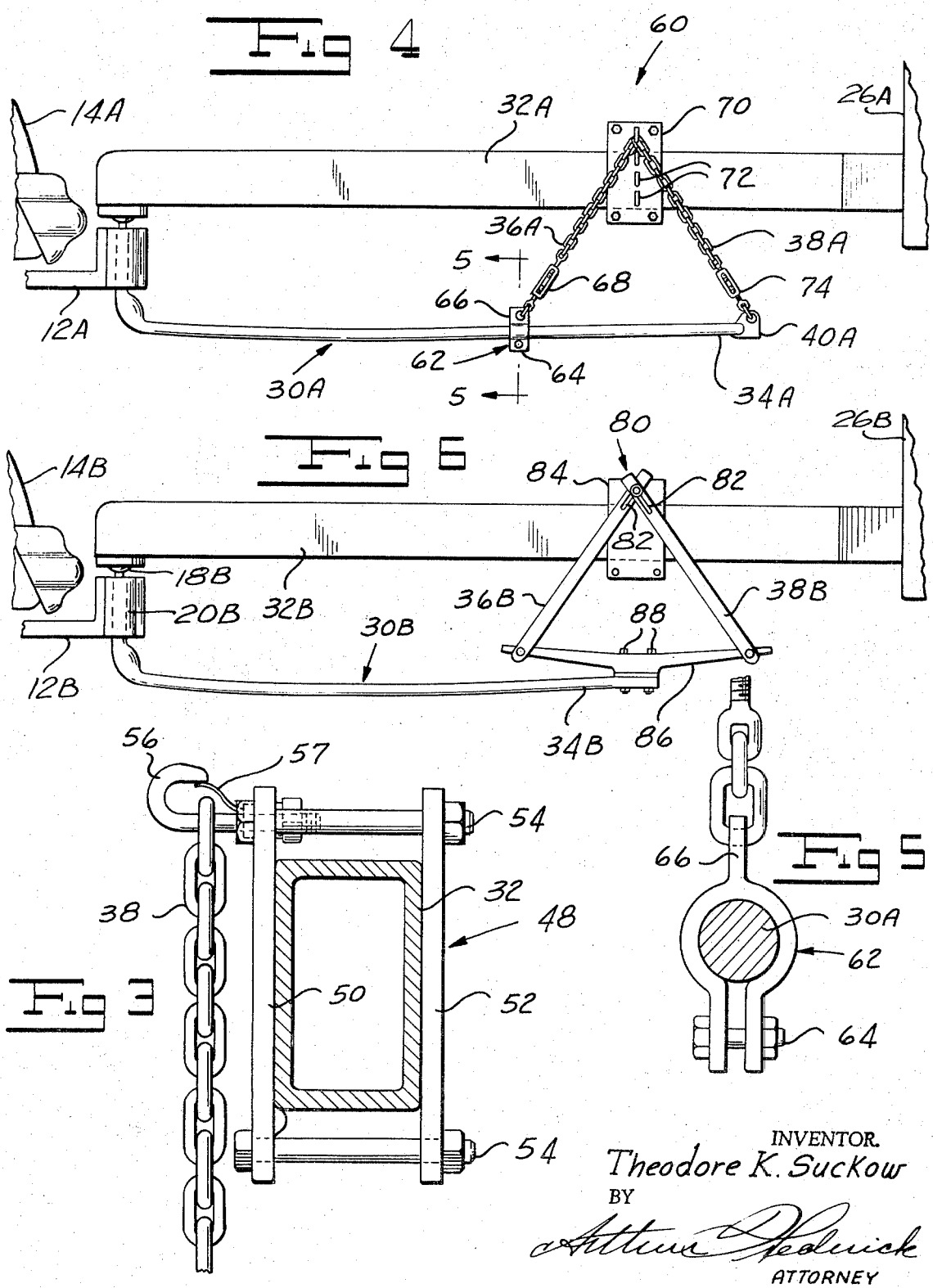

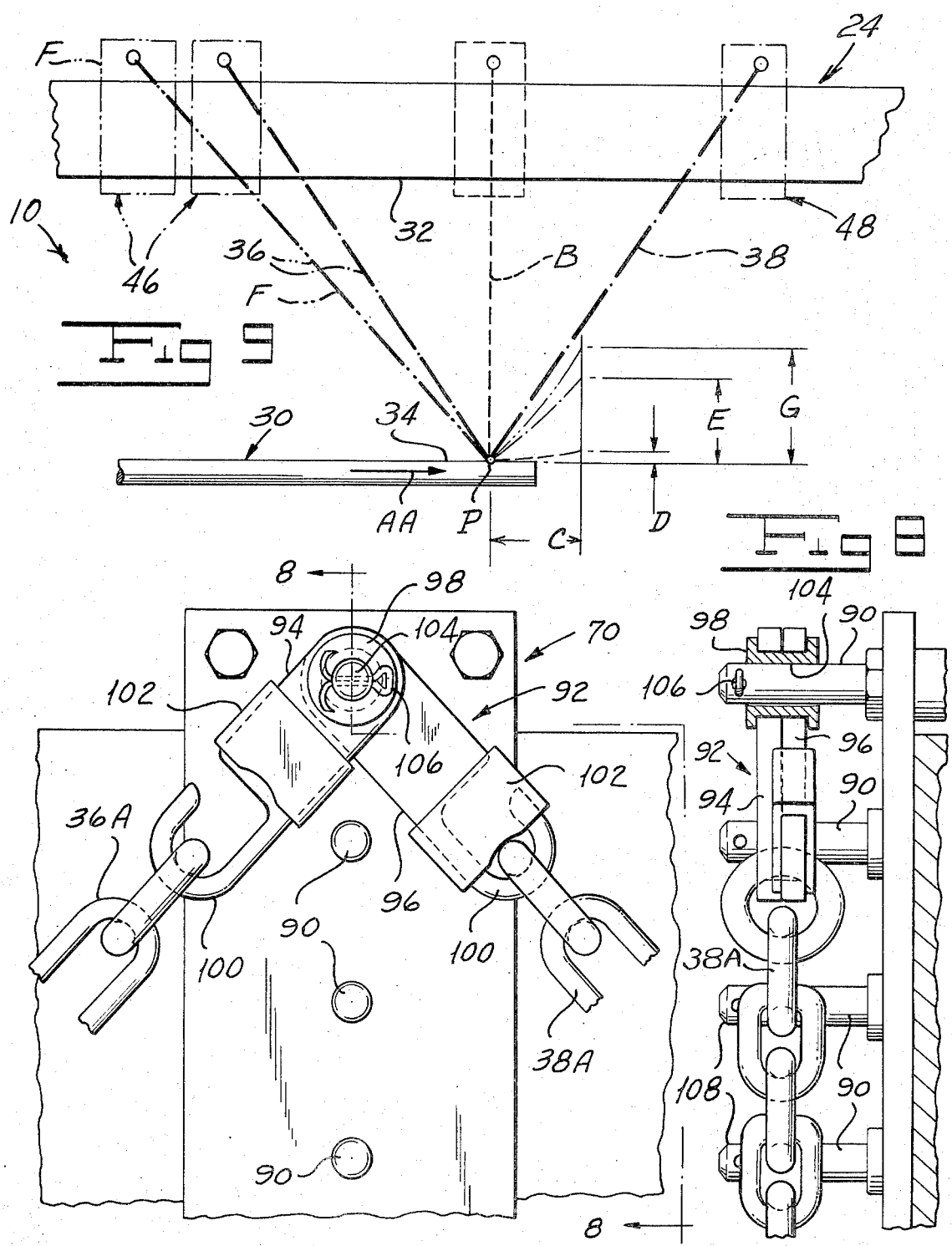

SPRING BAR ASSEMBLY FOR TRAILER HITCHES

This invention relates to safety load equalizing and stabilizing device for automobile towed trailers and, more specifically, to an improved spring bar assembly for trailer hitches.

BACKGROUND OF THE INVENTION

In conventional types of spring bar assemblies one end of the cantilever spring bar is pivotally secured to the tractive vehicle adjacent the ball hitch assembly and the distal or free end portion is connected to the trailer frame (hereinafter referred to as the A-frame) in such a manner that the spring bar can move linearly relative to the A-frame. In some spring bar assemblies, as exemplified in the patents to Mathisen No. 2,597,657, and Reese No. 3,185,499, the free end of the spring bar is connected to the A-frame by a flexible suspension member, such as a chain. In another type of assembly, as exemplified in the patent to Reese No. 3,194,584, the distal end of the spring bar is suspended from the A-frame by a chain pivotally connected to a lever which, in turn, is pivotally secured to the A-frame, the spring bar end portion riding on vertical camming member secured to the lever. In these spring bar assemblies tensioning means is provided to impose a predetermined load on the spring bar by flexure of the latter to thereby effect a relieving of the trailer weight on the rear wheels of the tractive vehicle and redistribution of the weight so that the front and rear wheels of the tractive vehicle carry a more equal amount of the trailer weight. Also, the spring bar assemblies, under driving conditions, function to control side sway and therefore minimize "fishtailing" overswing or "jackknifing." These herein described conventional spring bar assemblies have not been sufficiently effective with regard to providing stability and minimization of "fishtailing" or overswing, particularly when swerving out of the line of travel at high speeds, to insure safe operation. One reason for this ineffectiveness is that the stabilizing force imposed in the A-frame, through the lift exerted on the distal ends of the spring bars, is relatively small per increment of relative horizontal movement between the A-frame and the spring bars. Thus, in the initial stages of misalignment between the tractive vehicle and trailer and the resultant side sway, the stabilizing force exerted by the spring bars is relatively small and only becomes sufficiently strong when overswing reaches an extreme condition. In addition, while heretofore known spring bar assemblies, in a condition where the trailer departs from its in-line position, relative to the tractive vehicle or, in other words, overswings, provide increased forces on the A-frame to minimize the rocking action of the trailer on its springs, it does not provide forces acting counter to the direction of overswing.

Accordingly, it is an object of the present invention to provide an improved spring bar assembly for trailer hitches which more effectively than heretofore spring bar assemblies resists the tendency of overswing or fishtailing.

Another object of this invention is to provide an improved spring bar assembly for trailer hitches which assembly imposes horizontal forces on the A-frame acting to counteract the trailer overswing in addition to exerting increased vertical loads acting against the sway of the trailer.

A further object of the present invention is to provide a spring bar assembly which is relatively simple and inexpensive to manufacture.

A still further object of this invention is to provide a spring bar assembly for trailer hitches which assembly is capable of exerting a greater vertical stabilizing force per increment of relative horizontal movement between the spring bars and A-frame than heretofore known spring bar assemblies.

SUMMARY OF THE INVENTION

The present invention, therefore, contemplates a novel spring bar assembly for trailer hitches which assembly comprises, in combination with an A-frame of a trailer and the trailer hitch assembly, a pair of cantilevered spring bars connected for articulation to the trailer hitch assembly. Each of the spring bars extends substantially parallel to opposite sides of the A-frame and is connected to the latter at its distal end portion by a dual suspension member. Each of the dual suspension members is connected to the associated side of the A-frame and the free end portion of the associated spring bar in such a manner that each of the dual suspension members is connected at substantially the same or common point and extend to two horizontally spaced points of attachment. This horizontal offset relationship of the points of attachment of each of the suspension members functions to provide, upon relative horizontal movement between the A-frame and its associated spring bar, a greater amount of lift of the spring bar per unit of linear relative horizontal movement between the associated spring bar and A-frame and, hence, a greater degree of deformation or bending of the spring bar, the increased flexure of the spring bar producing an increased stabilizing force than achieved by heretofore known spring bar assemblies.

In one embodiment of this invention each of the spring bars is disposed adjacent opposite sides of the A-frame and is connected by dual suspension members secured at spaced horizontal points on the A-frame and at a substantially the same point on the spring bar so that, in an overswing condition, the spring bars impose, through the suspension members and the biasing force of the spring bars, forces on opposite sides of the A-frame directed counter to the direction of overswing to thereby more quickly restore stability.

In another embodiment of this invention the dual suspension members for each spring bar is connected at substantially the same point on the A-frame and at horizontally off-set points on the spring bar.

BRIEF DESCRIPTION OF THE DRAWINGS

The above and other objectives and advantages of the present invention will appear more fully hereinafter from a consideration of the detailed description which follows when taken together with the accompanying drawings wherein three embodiments of the invention are illustrated and, in which:

FIG. 1 is a fragmentary, side elevational view of a trailer hitch having a spring bar assembly according to this invention;

FIG. 2 is a plan view of the trailer hitch and spring bar assembly shown in FIG. 1;

FIG. 3 is a cross-sectional view taken along line 3—3 of FIG. 1 on a somewhat enlarged scale;

FIG. 4 is a view similar to FIG. 1, showing spring bar assembly according to a second embodiment of this invention;

FIG. 5 is a cross-sectional view taken substantially along line 5—5 of FIG. 4 on a somewhat enlarged scale;

FIG. 6 is a side elevational view, similar to FIGS. 1 and 4, showing a third embodiment of the present invention with another alternative type suspension member;

FIG. 7 is a fragmentary view, in side elevation, of one means for attaching the dual suspension members to the bracket or anchoring saddle on the A-frame;

FIG. 8 is a cross-sectional view taken along line 8—8 of FIG. 7, and

FIG. 9 is a schematic illustration showing the improved deformation or bending of the spring bar for each increment of relative horizontal movement between the spring bar and A-frame achieved by the present invention over conventional spring bar assemblies.

DESCRIPTION OF PREFERRED EMBODIMENTS

Now referring to the drawings and, more particularly, to FIGS. 1 and 2, the reference character 10 generally designates the spring bar assembly according to a first embodiment of the invention which is attached to and coacts with a conventional trailer hitch assembly.

The trailer hitch assembly comprises a drawbar or carrier 12 in the form of a rigid bar or tube which is connected to the frame (not shown) of a tractive vehicle 14 and extends horizontally from the rear of the tractive vehicle. A ball hitch bracket 16 is provided on the distal end portion of carrier 12 and is formed either integrally with the carrier or attached thereto by welding or by suitable bolts. The ball hitch bracket 16 includes a ball hitch or kingpin 18 and two vertical trunnion socket elements 20 disposed on opposite sides of kingpin 18. The kingpin 18 is receivable in a semispherical socket 22 which is carried on the underside of the A-frame 24 of a trailer 26. Suitable means (not shown) is provided for locking the kingpin 18 in socket 22, but which still permits limited universal movement between the kingpin 18 and socket 22. To provide for exerting stabilizing forces on the trailer hitch assembly, each trunnion socket element 20 is constructed and arranged to receive the end portion 28 of a spring bar 30 which constitutes part of spring bar assembly 10.

As best shown in FIG. 2, each of the pair of cantilevered spring bars 30 extends from ball hitch bracket 16 beneath and substantially parallel to a leg 32 of A-frame 24 to a point short of trailer 26. While spring bars 30 are shown of the type disclosed in the U. S. patent to Mathisen, No. 2,597,657, it is to be understood that the invention is not limited to any particular spring bar or manner of pivotal connection to the tractive vehicle and, therefore, may be spring bars such as disclosed in the U. S. patents to Reese, No. 3,194,584 and Hendricks, No. 3,552,771, without departure from the spirit and scope of this invention.

In accordance with a first embodiment of the invention the free end or distal end portion 34 of each spring bar 30 is connected or tethered to the adjacent leg 32 of A-frame 24 by dual suspension members 36 and 38. Each of the suspension members 36 and 38 may be in the form of a flexible link chain, as shown in FIG. 1, rigid links (see FIG. 6) with slip joints, or wire cable (not shown). One end of each of the suspension members 36 and 38 is secured to distal end portion 34 of spring bar 30, through an anchor plate 40 welded or otherwise suitably secured to the distal end portion 34. The opposite ends 42 and 44 of suspension members 36 and 38, respectively, are connected to leg 32 of the A-frame through brackets 46 and 48 mounted in spaced relationship with each other on leg 32 of A-frame 24.

As best shown in FIG. 3, each of the brackets 46 and 48 may comprise two plates 50 and 52 disposed on opposite sides of leg 32 and drawn tightly against leg 32 by bolts 54. A hook 56 which is preferably of the type closed by a leaf spring 57, is secured to the upper portion of plate 50. To secure suspension members 36 and 38 to brackets 46 and 48, respectively, a link of the member to be secured is passed over hook 56 as is clearly illustrated in FIG. 3. While hooks 56 are shown and described, it is within the purview of the present invention to employ any suitable coupling or anchoring means.

To preload spring bar 30 and thereby effect the desired distribution of trailer weight between the front and rear wheels of the tractive vehicle 14, suspension members 36 and 38 are shortened or lengthened. This can be quickly and easily accomplished by disengaging the link of the chain suspension members from their respective hooks 56 and engaging the hooks in different links of the suspension members. A further adjustment of preload can be achieved by repositioning of one or both of the brackets 46 and 48 on leg 32 of A-frame 24 as illustrated by the dot-dash line in FIG. 1.

The spring bar assembly 10 of this invention herein described provides improves stability and resistance to overswing or "fishtailing" as hereinafter explained with reference to FIGS. 1 and 9 wherein the conventional suspension means as exemplified in the U. S. Pat. No. 2,597,657 to Mathisen and the Reese U.S. Pat. No. 3,185,499 is compared with the function of the spring bar assembly 10.

In an overswing or "fishtailing" condition where trailer 26 moves out of towing alignment shown by the broken line A—A in FIG. 1, relative horizontal movement occurs between spring bar 30 and leg 32 of A-frame 24. This relative horizontal movement imposes through the suspension member 36 or 38 a lifting or deformation force on spring bar 30. This deformation or bending force increases the downwardly directed reactive force imposed by the spring bar, through the suspension member, on A-frame 24. As illustrated in FIG. 9, with the use of the conventional suspension as shown in broken line B, a relative horizontal movement between the A-frame 24 and the spring bar in the direction of the arrow AA for a distance C, produces a lift on the spring bar of distance D. This is to be compared with the lift on the spring bar achieved by the suspension members according to the present invention wherein the suspension members 36 and 38 are shown by the dot-dash lines. As illustrated when relative horizontal movement between the spring bar and A-frame of a distance C occurs, the lift on spring bar 30 is in amount E, as compared to an amount D for the conventional spring bar assembly for the same distance C. Obviously, the reactive force exerted by the spring bar varies in direct proportion to the extent of lift or to the degree of deformation and, therefore, the greater the lift (distance D or E) the greater the reactive stabilizing force. Of course, the same relationship and results are obtained upon relative horizontal movement between spring bar 30 and the leg of A-frame 24, as above described, when the movement is in the direction opposite to arrow AA and where suspension member 36 exerts the lifting force.

Also illustrated in FIG. 9 is the effect the adjustment of brackets 46 and 48 on leg 32 of A-frame 24 has on the degree or extent of lift imposed on the spring bar. If bracket 46 is relocated on leg 32 to a position further away from an imaginary vertical plane containing connection P of the suspension members, as shown by the dash double dot line, F, the lift distance changes from E to the distance G upon relative horizontal movement of a distance C. Thus, each of the suspension members 36 and 38 can be independently adjusted to exert a predetermined lift per increment of relative horizontal movement between spring bar 30 and A-frame 24.

In addition to the downwardly directed force exerted by each of the spring bars 30, through the suspension members 36 and 38, the spring bar assembly 10 produces a torque force on the A-frame acting counter to the direction of overswing. This effect is achieved by the cooperative function of spring bars 30 adjacent each of the legs 32 of A-frame 24. Upon overswing in one direction or the other, the force exerted by spring bars 30 through their respective suspension members is exerted at different points on each side of the A-frame thus producing a net torque force counter to the direction of misalignment. More specifically, if an overswing occurs in a direction where, as viewed in FIG. 2, the trailer swings counterclockwise about kingpin 18, suspension member 36 of the spring bar adjacent the upper leg 32 exerts a force on that leg through bracket 46 while suspension member 38 applies the stabilizing force on the other leg 32 through bracket 48. Thus, the force component exerted longitudinally through each spring bar produces a net torque force counter to the direction of overswing.

In FIG. 4 is shown a second embodiment of the present invention in which a spring bar assembly 60, similar to spring bar assembly 10 of FIGS. 1 to 3, is illustrated. The spring bar assembly 60 only differs from spring bar assembly 10 in that the dual suspension members are connected to the A-frame at substantially the same point and to the spring bar at spaced points. The parts of spring bar assembly 60 corresponding to like parts of spring bar assembly 10 will be identified by the same reference number but with the suffix A added thereto.

In spring bar assembly 60, suspension member 36A is connected to a split bracket 62 which is clamped in a desired position inwardly of the distal end portion 34A of spring bar 30A. As best shown in FIG. 5, a bolt 64 draws the two parts of bracket 62 together and in tight abutment around spring bar 30A. One end of suspension member 36A is secured to an ear 66 of bracket 62, via a turnbuckle 68. The opposite end of suspension member 36A is secured to a bracket 70 on one of a plurality of vertically spaced hooks 72. The bracket may be secured to leg 32A of the A-frame in the same manner as brackets 46 and 48 or in any other suitable manner well known to those skilled in the art. The other suspension member 38A is secured to a bracket 40A, similar to bracket 40, located at the distal end portion of spring bar 30A. The opposite end of the suspension member 38A is connected to bracket 70 on the same hook 72 as is suspension member 36A or on one of the other hooks 72. For adjustment purposes, suspension member 38A is also provided with a turnbuckle 74.

The spring bar assembly 60 functions in the same manner as spring bar assembly 10 to provide, as illustrated in FIG. 9, a relatively large increase in lift per linear increment of relative horizontal movement between spring bar 30A and leg 32A of the A-frame. It does not, however, provide as does spring bar assembly 10, a net torque force directed counter to the direction of overswing because the stabilizing force exerted on both of the A-frame legs 32A by the suspension members 36A and 38A is applied at substantially the same place on legs 32A of the A-frame.

In FIG. 6 is shown a spring bar assembly 80 according to a third embodiment of this invention which is similar to spring bar assembly 60 of FIG. 4 in that both suspension members are connected deformation at the same point on the legs of the A-frame and at spaced points on the spring bar. One difference between spring bar assembly 80 and the spring bar assembly 60 is that the suspension members are rigid links or arms instead of flexible chain members 36A and 38A. Another difference is that the suspension members are pivotally connected to the spring bar through an adapter bar bolted to the distal end portion of the spring bar so that regardless of which suspension member applies the deformation force, it is applied at the same point of the spring bar. The components of spring bar assembly 80 corresponding to like components of the spring bar assembly 60 will be designated by the same number but with the suffix B added thereto.

As shown in FIG. 6, since suspension members 36B and 38B are rigid arms, each arm has a slot 82 at on end to provide a "lost motion" or slip joint connection so that it can move relative to bracket 84 when the relative horizontal movement between spring bar 30B and leg 32B tends to bring the opposite arm connections in vertical alignment.

The adapter bar 86 is secured by bolts 88 to the distal end portion 34B of spring bar 30B or in some other suitable manner connected to spring bar 30B. The use of an adapter bar 86 facilitates the application of the present invention to many existing types of spring bars.

In FIGS. 7 and 8 is shown one suitable way in which the suspension chain members 36A and 38A and bracket 70 of spring bar assembly 60 may be constructed to provide for connection between the suspension members and the bracket.

While the bracket 70 is shown as comprising a component of the spring bar assembly 60, it obviously can be employed in place of the brackets 46 and 48 of spring bar assembly 10.

As shown, bracket 70 may be provided with a plurality of vertically spaced pins 90, instead of hooks 72, which pins 90 are adapted to receive a connector 92. The connector 92 comprises two arms 94 and 96 connected together by a hollow pivot pin 98. Each arm has a hook end portion 100 to receive a link of the suspension members. An axially movable slide 102 is mounted on each of the arms 94 and 96 to close and open hook end portions 100. The central opening 104 of pivot pin 98 is dimensioned to receive therethrough pins 90. As shown, the connector 92 is secured on pin 90 by a cotter key 106 which extends through a diametrical hole 108 in each of the pins 90.

Adjustment of suspension members 36A and 36B can be quickly accomplished by pulling cotter key 106 and relocating connector 92 on another pin 90 when the load on the extension members is relieved in any suitable manner (not shown), followed by inserting a cotter key in the newly selected pin 90.

It is believed now readily apparent that the present invention provides an improved spring bar assembly for trailer hitch assemblies which provides a substantially greater stabilizing force, when the trailer moves into an overswing or "fishtailing" condition of operation, then exerted by conventional spring bar assemblies. It is an assembly in one embodiment which provides, in addition to vertically directed stabilizing forces, a net horizontal torque force acting counter to the direction of overswing.

It is now to be understood that, while various embodiments of the present invention have been shown and described, the invention is not to be limited thereto. Various other changes and alternative arrangements and constructions can be made without departure from the spirit and scope of the invention as the same will now be understood by those skilled in the art. For example, it is contemplated that each suspension member may be connected at opposite ends to the spring bar and A-frame at points lying in spaced, imaginary, vertical planes so that the two suspension members form an X-pattern without departure from the scope and spirit of this invention.

What is claimed is:

1. In combination with a trailer hitch assembly consisting of a universal connection between a drawbar on a tractive vehicle and the frame of a trailer, a spring bar assembly comprising:
    a. a pair of spring bars;
    b. each spring bar being pivotally connected at one end portion to said drawbar and extending below and substantially parallel to each side of said trailer frame, and
    c. dual suspension members for each spring bar interconnecting the distal end portion of the spring bar with the adjacent side of the trailer frame in such a manner that opposite ends of each member are connected at fixed points lying in spaced, imaginary, vertical planes.

2. The apparatus of claim 1 wherein said dual suspension members are each flexible tethers but capable of transmitting load when under tension.

3. The apparatus of claim 1 wherein said dual suspension members are connected in such a manner that adjacent ends are connected at a substantially common point and their opposite ends secured at spaced points.

4. The spring bar assembly of claim 3 wherein said spaced points of connection are located on opposite sides of an imaginary vertical plane extending through the said substantially common point of connection.

5. The apparatus of claim 1 wherein each of said dual suspension members are rigid links having a lost motion connection at one end.

6. The spring bar assembly of claim 1 wherein said dual suspension members are connected at substantially the same point on the distal end portion of the spring bar and at spaced points on the frame.

7. The spring bar assembly of claim 6 wherein the dual suspension members are each chains.

8. The spring bar assembly of claim 7 wherein at least one of the chains includes a turnbuckle for adjustment of its length.

9. The apparatus of claim 1 wherein said dual suspension members are connected to bracket means mounted for positioning on the trailer frame and having means for being secured in a selected position.

10. The apparatus of claim 9 wherein said bracket means has a plurality of vertically spaced attachment means for effecting connection with the dual suspension members.

11. The apparatus of claim 1 wherein said dual suspension members are connected at spaced points on the distal end portion of said spring bar and at a substantially common point on the trailer frame.

12. The apparatus of claim 11 wherein said dual suspension members are connected adjacent the opposite ends of an elongated bar which is connected to the distal end portion of the spring bar to extend substantially parallel to said spring bar.

13. The apparatus of claim 1 wherein said trailer frame is the A-frame of the trailer.

14. In combination with a trailer hitch assembly consisting of a universal connection between a drawbar on a tractive vehicle and the A-frame of a trailer, a spring bar assembly comprising:
    a. a pair of spring bars,
    b. each spring bar being pivotally connected to said drawbar and extending below in cantilevered relation to a leg of the A-frame,
    c. two suspension members for each spring bar extending between the spring bar and adjacent leg of the A-frame so that adjacent ends of each suspension member are connected at substantially a common point and the opposite adjacent ends of each suspension member are connected at spaced fixed points lying on the opposite sides of an imaginary vertical plane extending through the said common point of connection.

15. The apparatus of claim 14 wherein said suspension members are chains each of which is connected at said spaced points on the leg of the A-frame and at their opposite ends at said substantially common connection point located on the distal end portion of the spring bar.

16. The apparatus of claim 14 wherein said suspension members are chains each of which is connected at spaced points on the spring bar and at their opposite ends at said substantially common point on the adjacent leg of the A-frame.

* * * * *